United States Patent

[11] 3,592,044

| [72] | Inventors | Donald E. Green<br>Sunnyvale;<br>Duane P. Littlejohn, Santa Clara, both of, Calif. |
|---|---|---|
| [21] | Appl. No. | 749,383 |
| [22] | Filed | Aug. 1, 1968 |
| [45] | Patented | July 13, 1971 |
| [73] | Assignee | Varian Associates<br>Palo Alto, Calif. |

[54] SAMPLE HANDLING MEANS FOR USE IN GAS ANALYSIS APPARATUS
12 Claims, 7 Drawing Figs.

[52] U.S. Cl. ........................................... 73/23.1, 23/294
[51] Int. Cl. ........................................... G01n 31/08, B01j 17/28
[50] Field of Search .......................... 73/23.1, 25, 23, 19, 61.1, 61.3, 421.5, 422 GC; 55/267, 268, 269, 67, 197, 386; 165/101; 23/294

[56] References Cited
UNITED STATES PATENTS

| 3,042,501 | 7/1962 | Noblitt | 23/294 |
| 3,267,646 | 8/1966 | Kauss et al. | 73/23.1 |
| 3,429,904 | 2/1969 | Eisertraut et al. | 23/294 |
| 3,471,692 | 10/1969 | Llewellyn et al. | 73/23.1 UX |
| 3,427,863 | 2/1969 | Schultz | 73/23.1 |

FOREIGN PATENTS

| 375,142 | 10/1959 | Japan | 73/23.1 |
| 818,703 | 8/1959 | Great Britain | 73/23.1 |

*Primary Examiner*—Richard C. Queisser
*Assistant Examiner*—Ellis J. Koch
*Attorneys*—William J. Nolan and Leon F. Herbert ABSTRACT: A gaseous sample handling apparatus utilizing the principles of condensation and revaporization to allow selected quantities of sample to be temporarily stored within the flow path connecting a gas chromatograph and a gas analyzer so that the samples can at some later time be reintroduced into the flow stream at predetermined mass flow rates. Likewise, the apparatus permits the preferential reshaping of constituent peaks in the effluent of a gas chromatograph.

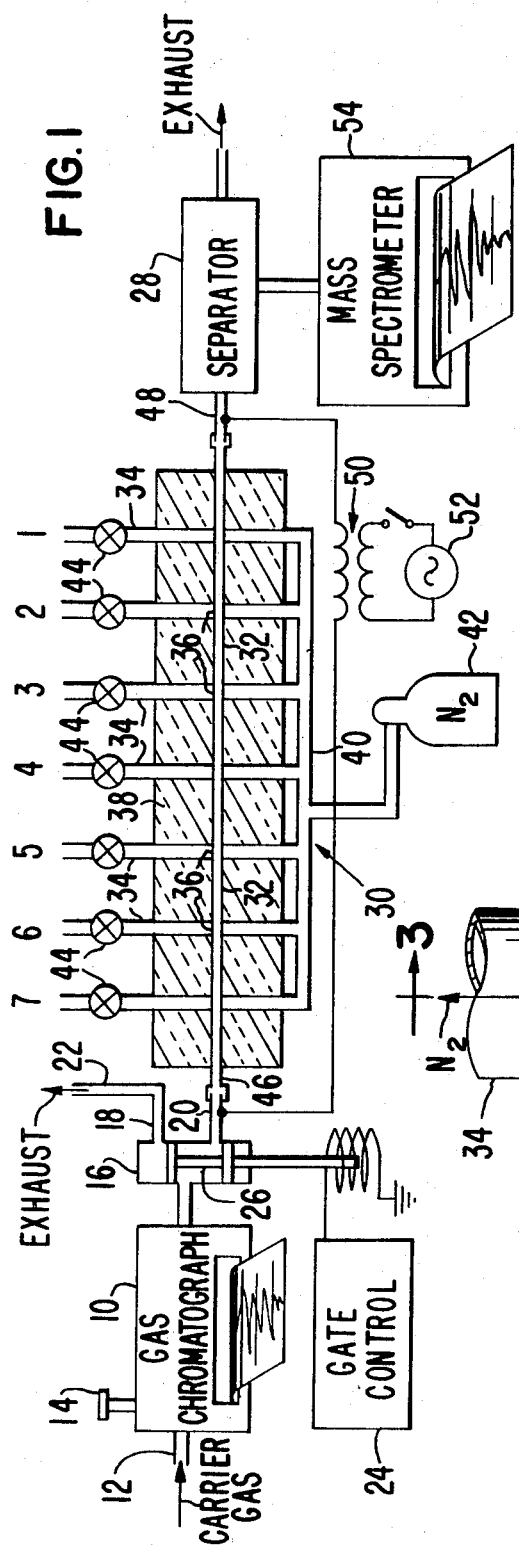
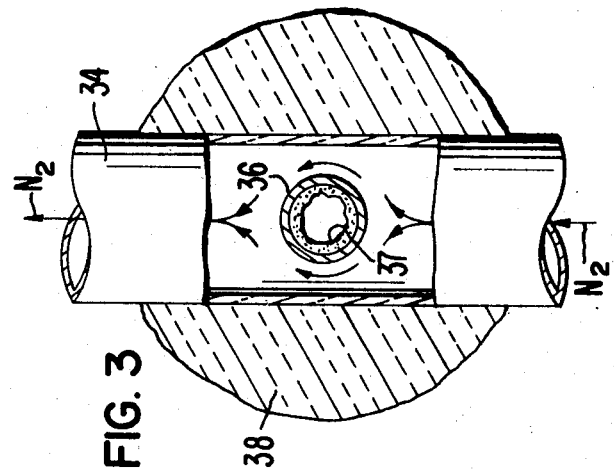
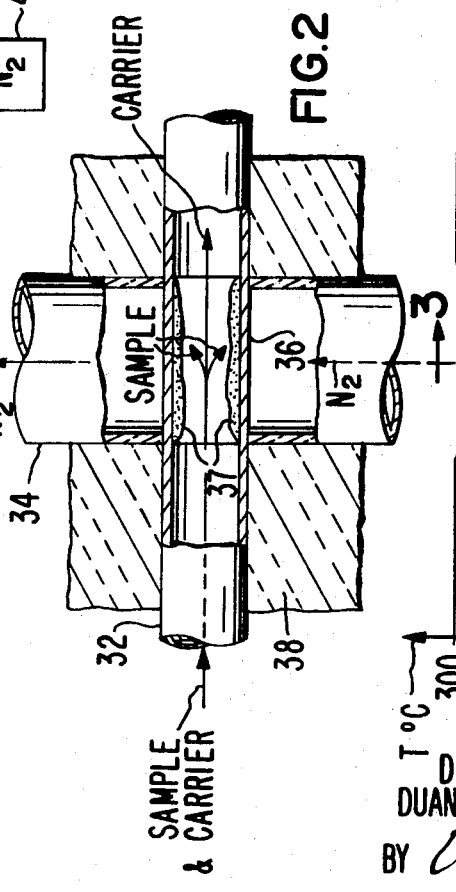
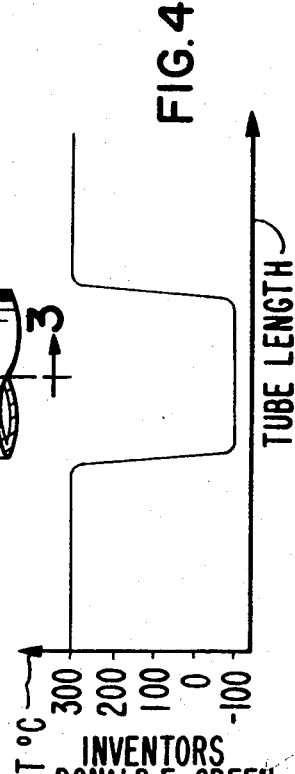

INVENTORS
DONALD E. GREEN
DUANE P. LITTLEJOHN
BY
ATTORNEY

SAMPLE HANDLING MEANS FOR USE IN GAS ANALYSIS APPARATUS

STATEMENT OF THE INVENTION

The invention relates generally to gas analysis apparatus and more specifically to a means for performing an inline alteration of the concentration of a quantity of gaseous sample material so as to render the sample or a portion thereof more suitable for subsequent analysis.

DISCUSSION OF THE PRIOR ART

The evolution of certain gas separation apparatus making possible the inline combination of such analytical tools as the gas chromatograph and the mass spectrometer as well as other sensitive gas analysis apparatus has produced many important advances in sample handling technology. Notable among these devices are the Llewellyn separator, disclosed in U. S. Pat. No. 3,455,092 issued July 15, 1969 and assigned to the assignee of the present invention, which permits sample enrichments of previously unheard of proportions, and the Littlejohn sampling gate, disclosed in U. S. Pat. application Ser. No. 626,193 filed Mar. 27, 1967 now abandoned and also assigned to the assignee of the present invention, which permits the precision introduction of all or any portion of a sample peak into the flow stream interconnecting the gas chromatograph and mass spectrometer.

In still another important development a sample storage column has been provided in the interface equipment which enables one or more selected portions of a sample material to be selectively stored and then introduced at a later time into the mass spectrometer. This apparatus is disclosed in U. S. Pat. No. 3,507,147 issued Apr. 21, 1970 and likewise assigned to the assignee of the present invention. This apparatus enables the investigator to at some later time analyze only that material in which he is primarily interested, thus permitting greater resolution and more accurate determination of the unknown sample constituents and/or their relative relationships.

As the art has developed, it has been found desirable that one be able to control not only the type and quantity of material which is introduced into the gas analyzer from the eluate of the chromatograph but also the concentration of the particular peaks involved. The present invention permits such control and utilizes the well-known principles of condensation and revaporization in a novel apparatus which enables sample selection and storage as well as sample concentration in a continuous flow gas analyzing system.

Although the principles of condensation and revaporization of gaseous state materials have been previously utilized in association with gas chromatographic equipment these applications have generally been restricted to use in the flow path upstream of the chromatographic column for such purposes as preseparation (See Tracht, U. S. Pat. No. 3,053,077) or as a means for driving off entrained air in the sample. (See Lively et al., U. S. Pat. No. 3,205,700).

OBJECTS OF THE INVENTION

It is therefore a principal object of the present invention to provide a means whereby the concentration of a given quantity of gaseous material can be increased or decreased at will in a continuous flow system, or, the sample can be temporarily stored for later analysis.

Another object of the present invention is to provide a gaseous sample handling system wherein selected peaks in a chromatographic eluate may be selectively stored and then released at selected later times for introduction into an analysis device.

Still another object of the present invention is to provide a gaseous sample handling system wherein the concentration of one or more peaks in a chromatographic eluate may be increased, decreased, or otherwise modified at the will of the investigator.

Still other objects and advantages of the present invention will become apparent after a reading of the following description of a preferred embodiment, and the operation thereof as illustrated in the drawing wherein:

IN THE DRAWING

FIG. 1 is a schematic illustration of a gas chromatographic-mass spectrometer system incorporating one embodiment of the present invention, FIG. 2 is a more detailed illustration of a portion of the sample concentration apparatus illustrated generally in FIG. 1, FIG. 3 is a section taken through the sample concentration element illustrated in FIG. 2, FIG. 4 is a temperature diagram illustrating the operation of the sample concentrating element shown in detail in FIGS. 2 and 3, FIG. 5 is a chromatogram used to illustrate operation of the invention, FIG. 6 s a timing diagram for gate valve 16 for use with the chromatogram of FIG. 5, and FIG. 7 illustrates one form which the reconstituted peaks might take after having been reformed in accordance with the present invention.

DETAILED DESCRIPTION OF THE INVENTION

Figure 5:
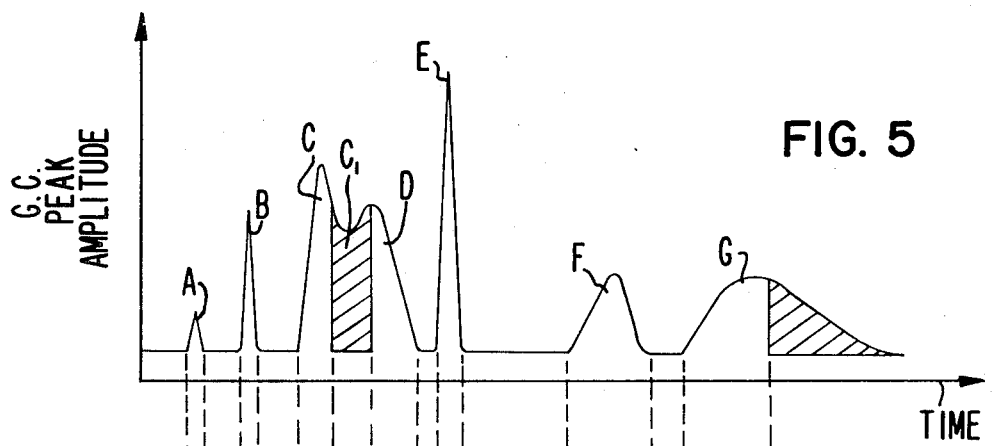

Referring now to the drawing, there is shown in FIG. 1 a gas chromatograph 10 into which a carrier gas is introduced at 12 thereby causing a sample material injected at 14 to be carried through the gas chromatograph 10 for separation into its constituent parts. As the sample peaks are eluted from the gas chromatograph 10 they are passed through a sampling gate 16 which directs the flow between either of the alternative flow paths 18 or 20. The operation and a preferred embodiment of the structure of this sampling gate are disclosed in the aforementioned Littlejohn patent application Ser. No. 626,193. The flow path 18 leads to an exhaust port 22 while the flow path 20 directs the chromatographic effluent into the main flow path joining certain other sample handling apparatus and sample analyzing apparatus.

In order to control the operation of the gate 16 a suitable manual or automatic gate control means 24 is provided for selectively positioning the flow directing spool 26 of the gate 16. Interconnecting the port 20 of gate 16 and a gas separator 28 such as the Llewellyn separator disclosed in the aforementioned patent application Ser. No. 511,756 is a sample storage and concentration control unit 30. The unit 30 consists essentially of a long thin stainless steel tube 32, typically one-sixteenth inch in diameter which passes through apertures in a plurality of glass tubes 34, numbered 1 through 7, and typically of about one-quarter inch in diameter. The segments 36 of tube 32 which are disposed within the fluid flow path defined by glass tubes 34 comprise a plurality of condensation chambers axially spaced along the effluent flow path wherein the gaseous constituents of the sample gas may be temporarily retained as a viscous condensate adhering to the walls of the tube 32. The length of tube 32 including the junctions with the glass tubes 34 are enclosed in a thermal insulation blanket 38.

One end of each of the glass tubes 34 terminates in a manifold means 40, which is connected to a source 42 of cold nitrogen gas or other fluid at a predetermined low temperature, for directing the cooling fluid through the glass tubes 34. In order to control the flow of gases through the respective tubes 34, thus regulating the rate at which heat is removed from the respective condensation chambers 36, a plurality of valves 44 are provided at the other end of each of the tubes 34. By providing the valves 44 in the positions shown it is possible to provide cooling fluid about the chambers 36 in either the gas or the liquid state since the effect of restricting the fluid flow path is to raise the pressure therein and consequently raise the boiling temperature of the liquid nitrogen or other coolant used in the system. On the other hand the valves 44 may be placed on the manifold side of the tubes 34 but by so doing the coolant is practically limited to use in the vapor state.

In order to supply heat to the tube 32 so as to normally maintain the flowing sample in a vaporized state, the ends 46 and 48 thereof are connected in circuit with the secondary winding of a transformer 50 which through a power supply means 52 causes a predetermined current to be passed through the tube 32 thereby causing it to be heated due to its resistive characteristics. By judiciously controlling the electric current flowing through the walls of the tube 32 the tube can be heated to any desired temperature and will be maintained at this temperature uniformly along its length by the insulating qualities of the thermal blanket 38 so long as the vapor flow control valves 44 remain closed.

By opening a valve 44 the cooling fluid is caused to flow through the tubes 34 and around the condensation chambers 36 so that the temperature of that portion of the tube will be markedly reduced thus causing a sharp discontinuity in the thermal characteristics of the flow path through the tube 32. As will be explained in more detail below, a sample gas caused to pass through the tube 32 will continue to pass through the tube until one of the valves 44 is opened causing the corresponding section 36 to be cooled to a temperature sufficient to cause the sample constituent to condense on the walls of the tube 32. A subsequent closing of the valve 44 will cause the temperature of the segment 36 to again rise and revaporize the sample so that it is again propelled by the viscous forces of the carrier gas and caused to flow into separator 28 where it will be separated from the carrier gas and introduced into the mass spectrometer 54. Although shown as mass spectrometer, the analyzer 54 may be of any suitable type device, i.e., a magnetic resonance spectrometer, an infrared spectrophotometer, etc.

Referring now to FIGS. 2, 3 and 4 the operation of the sample storage and concentrating means 30 generally illustrated in FIG. 1 will be described in more detail. As shown in FIG. 2 the stainless steel tube 32 is passed directly through the glass tubes 34 and the intersection is well insulated by the thermal blanket 38. As the electrical current is passed through tube 32 including the segment 36 enclosed within tube 34 the temperature thereof is raised to approximately 300° C. which is sufficient to assure that all of the sample material is in its vapor state and that none is allowed to condense and remain on the walls of the tube 32. However, should one of the valves 44 be opened so as to allow the nitrogen vapor to pass through the tube 34 it will be apparent that due to the extremely low temperature of the nitrogen vapor (approximately −196° C.), heat will be removed from the section 36 of the tube 32 and a sharp temperature gradient will appear at the intersection of the tube 32 and each of the walls of the tube 34. An exemplary temperature gradient along the illustrated section of tube 32 is shown in FIG. 4.

The section 36 of tube 32 which is wholly within the tube 34, i.e., approximately one-quarter inch in length will be reduced to a temperature below that required for causing the sample material to condense on the walls of the tube 32, but not to such a low temperature as to cause the carrier gas to condense. As is shown in FIG. 2 the condensed sample 37 will adhere to the wall of segment 36 and thereby be stored within the short one-quarter inch section tube 32 and may be retained there, notwithstanding the passing flow of carrier gas, so long as the cold nitrogen vapor is caused to continue to flow through the tube 34. Should it then be desirable to release the sample back into the flow stream of the carrier gas in a more concentrated form than the original peak, the valve 44 may be rapidly closed in order to reintroduce the sample quickly back into the flow stream by revaporization. On the other hand the valve 44 may be slowly closed so as to control the rate of coolant flow, i.e., the rate of heat removal, so as to prolong the time over which the sample is introduced into the flow stream and thus broaden the original peak. In a preferred embodiment the valves 44 include a selectively variable restriction in combination with a snap open and close feature so that a selected flow rate of coolant can be abruptly initiated or terminated.

Perhaps mention should be made here of certain advantages which one might obtain by using the present invention as heretofore described. It is quite common in the chromatographic separation of gaseous mixtures that constituent peaks may take as long as a few seconds to several minutes to be eluted. This means that the length of tubing which would be occupied by the peak at any one time could be quite long. For example, with a carrier gas flow at the normal rate of 2 feet per second, a peak of 10 second duration would occupy a tube length of 20 feet. To store such a peak in an ordinary open flow tube would require a tube of at least 20 feet in length.

Since concentration in this case is defined as weight of sample per unit time with the carrier gas flowing at fixed velocity and constant pressure, the concentration of the exemplary peak described above must be relatively low. By using the method and apparatus of the present invention this peak can be condensed in a one-quarter inch segment of the tube retained there for any desired period of time and then flash vaporized back into the flow stream so that the entire quantity of sample previously distributed over a 20 foot length of flow path is subsequently distributed along only a fraction of that length. By referring back to our recited definition of concentration it will be seen that the concentration of sample has thus been markedly increased.

To the other extreme, suppose the chromatogram of a given sample includes a very large highly concentrated peak and the particular experiment requires that a sample of low concentration be applied to the subsequent analyzing apparatus over a long period of time. This conversion can also be accomplished using the apparatus of the present invention by collecting the sample in one or more of the sections 36 in the manner described above and then closing down the appropriate valve(s) 44 so as to raise the temperature of the condensate to a value at which the sample is slowly boiled off so as to be reintroduced back into the carrier gas stream for transit to the separator 28.

In some applications it has been found desirable to introduce some form of mechanical obstruction into the flow path of tube 32 so as to increase the surface area upon which the condensate might become attached for storage. A loose packing of glass wool or the like provides a suitable means for trapping aerosols produced in the flow stream which might not otherwise collide with the tube walls during their transit through the cooled section and thus be carried out of the storage section to be revaporized. Such a packing should not however produce a substantial obstruction to the flow of carrier gas through the device.

Figure 6:
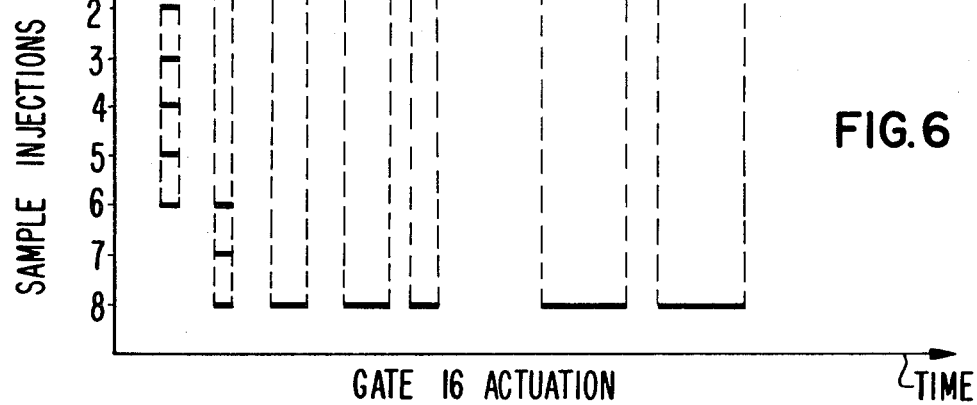

Referring now to FIG. 5 of the drawing, there is shown for purposes of illustration a chromatogram of the type which might be observed emerging from the chromatograph 10. The chromatogram includes a plurality of peaks of various concentrations and amplitudes as well as a pair of unresolved peaks C and D and a pair of broadened peaks F and G. In order to explain in one example several of the possible methods of operation which are permitted using the apparatus of the present invention, FIGS. 5, 6 and 7 will be referred to as illustrative of several of the advantages which the present invention offers over the prior art.

Assume that the particular experiment requires that each sample introduced into the analyzer 54 be of substantially the same concentration. Remembering that concentration is defined as weight (or quantity) of sample per unit time one can visually observe the height of the peaks shown in FIG. 5 and determine that the concentrations of the respective peaks are not equal since only peaks of equal height are of equal concentration where pressure and flow rate are maintained constant.

Obviously, the quantity of material in the peaks shown in FIG. 5 varies with each peak as well as does the concentration. The quantity of material in peak A, for example, is considerably less than that of peak E although the time width of the two peaks is roughly the same. Similarly, the concentrations of the peaks F and G are low while the quantity of material under the peaks is equal to or greater than that of the peak E. By comparing the areas under the peaks A and B, for example, it will be observed that the area under peak A is approximately one-sixth of that under the peak E, while the area under peak B is approximately one-third of that under peak E. Therefore, in order to store in each of the 7 condensation chambers 7, of the unit 30, equal quantities of sample material (where peak E is taken as the reference peak, one might inject the sample into the chromatograph 10 five time in series and programs the gate control 24 so as to allow only the peak A to be passed through gate 16 into unit 30 after each injection. Valve 44-1 in line 1 would be opened so as to cause each peak A which travels through the conduit to be condensed within the one-quarter inch segment 36-1 of tube 32 corresponding to the vapor line 1.

For the next injection the gate valve 16 would be opened so as to allow both of peaks A and B to pass through so that the sixth peak A could be collected in segment 36-1. After peak A has had time to pass through segment 36-2 of tube 32 valve 44-2 is opened so as to cool segment 36-2 to collect the first sample peak B. On the next injection gate 16 is opened to allow only peak B to pass for collection in segment 36-2. For the third collection of peak B the gate 16 is opened to allow at least portions of all of the peaks following A to be passed into unit 30 since the areas under all of peaks C-G are equal to or greater than that of reference peak E.

In order to allow only portions of such peaks as the unresolved peaks C and D and broad peak G the gate control may be provided with an integrating means such as that disclosed in copending U.S. Pat. application Ser. No. 698,019 filed Jan. 15, 1968 and assigned to the assignee of the present invention. Here the control means would allow the gate to be opened to peak C only until a predetermined quantity of sample had passed. The gate 16 would then close and upon sensing a predetermined event such as the maximum of peak D would reopen to allow a predetermined quantity of peak D to pass. A similar control function would be utilized in the case of large peak G. And as each preceding quantity of sample passes through the segments 36 the respective valves 44 would be opened so that the respective portions of peak C through G were collected in segments 36-3 through 36-7.

Figure 7:
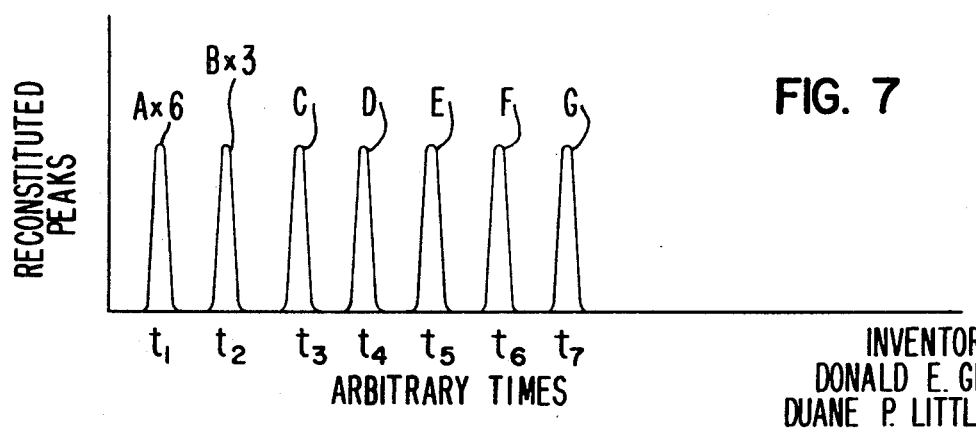

With equal quantities of sample now collected in each of the segments 36 of tube 32, the valves 44-1 through 44-7 may then be closed serially at selected times so as to allow the reentry of the sample into the flow stream for subsequent introduction into the analysis apparatus 54. However, the concentrations of each of the peaks are now approximately equal as indicated in FIG. 7 of the drawing.

This example is obviously only one of many schemes in which the apparatus of the present invention may be utilized. The same end could also be achieved with a single sample injection by using the smallest peak as the reference and then extracting only that quantity of sample from each peak for respective storage in the segments 36.

After having read the foregoing disclosure many additional techniques of use and alterations and modifications of the invention will become apparent to those of skill in the art. It is therefore to be understood that the foregoing description of the preferred embodiment is for purposes of illustration only and is intended in no way to be limiting. Accordingly, we intend that the appended claims be interpreted as covering all modifications, variations, alterations and the like which reasonably fall within the true spirit and scope of our invention.

We claim:

1. A gaseous sample handling apparatus for utilization in the flow stream connecting a quantitative gas analyzing means and a qualitative gas analyzing means said apparatus comprising:

an elongated generally tubular conduit means providing a flow path for a quantity of gaseous state sample material which is propelled therethrough by the viscous forces of a flowing inert carrier gas, means for continuously applying heat uniformly along at least a portion of said conduit means so as to cause said sample material flowing therethrough to be heated to a predetermined temperature, and cooling means for selectively cooling at least one short segment of said uniformly heated section of conduit means to a temperature low enough to cause said sample material to condense upon the walls of said conduit along said short segment.

2. A gaseous sample handling apparatus as recited in claim 1 wherein said conduit means has electrically resistant properties and said means for continuously applying heat to said conduit means includes a current supply means coupled to either end of said conduit for passing a predetermined current through said conduit means so as to cause said conduit means to be heated to a temperature adequate to vaporize the sample passed therethrough.

3. A gaseous sample handling apparatus as recited in claim 2 wherein said means for selectively cooling at least one short segment of said conduit means includes means for variable passing a cooling fluid across the outer surface of said short segment of said conduit means thus causing the temperature of said short segment to be reduced at a rate exceeding the rate at which thermal energy is being supplied by the current being passed therethrough.

4. A gaseous sample handling apparatus as recited in claim 3 wherein said means for passing a cooling fluid across the outer surface of said short segment of said conduit means comprises a second conduit means of greater cross-sectional area than said first mentioned conduit means and through the walls of which said first mentioned conduit means is passed so that the length of said short segment is defined by the intersection of the first mentioned conduit means with the walls of said second conduit means, and valve means in said second conduit means for regulating the flow of said cooling fluid through said second conduit means.

5. A gas analyzing apparatus comprising:

a gas chromatograph for time separating the gaseous constituents of a sample mixture of gases injected thereinto, qualitative gas-analyzing means for identifying said gaseous constituents of said sample mixture, gas-handling means for connecting the output of said gas chromatograph to the input of said qualitative gas-analyzing means, said gas-handling means including a valve means for selectively directing the effluent of said gas chromatograph into either of two flow paths, one of which ultimately leads to the input of said qualitative gas-analyzing means through a sample concentration and storage means, said last mentioned means including an elongated section of generally tubular conduit, means for supplying thermal energy uniformly along the length of said elongated section, and means for selectively cooling one of a plurality of well defined relatively short portions of said uniformly heated elongated section of conduit so as to cause the temperature of said short portions to be reduced below the condensation temperature of the sample gas being transported therethrough by the carrier gas.

6. A gas-analyzing apparatus as set forth in claim 5 wherein said conduit means has electrically resistive properties and said means for continuously applying heat to said conduit means includes a current supply means coupled to either end of said conduit for passing a predetermined current through said conduit so as to cause said conduit to be heated to a temperature adequate to vaporize the sample being passed therethrough.

7. A gas-analyzing apparatus as set forth in claim 6 wherein said cooling means for selectively cooling at least one short segment of said conduit means includes means for variably passing a cooling fluid across the outer surface of said short segment of said conduit means thus causing the temperature of said short segment to be reduced at a rate exceeding the rate at which thermal energy is being supplied thereto.

8. A gas-analyzing apparatus as set forth in claim 7 wherein said means for passing a cooling fluid across the outer surface of said short segment of conduit means comprises a second conduit means of greater cross-sectional area than said first mentioned conduit means and through the walls of which said first mentioned conduit means is passed so that the length of said short segment is defined by the intersection of said first mentioned conduit means with the walls of said second conduit means, and valve means in said second conduit means for regulating the flow of said cooling fluid through said second conduit means.

9. A gas analysis apparatus including a gas chromatograph, a qualitative gas-analyzing means, and a gas-handling means coupling the effluent output of said gas chromatograph to the input of said qualitative gas-analyzing means, said gas-handling means comprising:

an elongated section of generally tubular conduit forming a portion of the flow path coupling said chromatograph and said qualitative gas-analyzing means, means for applying heat to said section uniformly along its length so as to raise the temperature of the gases flowing therethrough to within a predeterminate range of temperatures, and means for cooling at a variable selected rate from at least one segment of said elongated section so as to cause substantially all of the sample gas passing therethrough to condense on the walls of said segment and to remain there until the temperature of said segment is again raised above the condensing temperature of the sample gas.

10. A gas analysis apparatus as recited in claim 9 wherein said conduit has electrically resistive properties and said means for continuously applying heat to said conduit means includes a current supply means coupled to either end of said conduit for passing a predetermined current through said conduit so as to cause said conduit to be heated to a temperature adequate to vaporize the sample passing therethrough.

11. A gas analysis apparatus as recited in claim 10 wherein said means for selectively cooling at least one segment of said conduit includes means for passing a cooling fluid across the outer surface of said segment of said conduit thus causing the temperature of said segment to be reduced at a rate exceeding the rate at which thermal energy is being applied thereto.

12. A gas sample handling apparatus as set forth in claim 1 in which said cooling means variably cools at least one of a plurality of short segments of said conduit means.